No. 847,202. PATENTED MAR. 12, 1907.
J. OLTMANNS.
PROCESS OF FORMING BUILDING MATERIAL.
APPLICATION FILED JUNE 11, 1906.

WITNESSES

INVENTOR
Johannes Oltmanns
BY
ATTORNEYS

UNITED STATES PATENT OFFICE.

JOHANNES OLTMANNS, OF RINTHEIM, BADEN, GERMANY.

PROCESS OF FORMING BUILDING MATERIAL.

No. 847,202.  Specification of Letters Patent.  Patented March 12, 1907.

Application filed June 11, 1906. Serial No. 321,196.

*To all whom it may concern:*

Be it known that I, JOHANNES OLTMANNS, a subject of the Emperor of Germany, and a resident of Rintheim, Baden, Germany, have invented a new and Improved Process of Forming Building Material, of which the following is a full, clear, and exact description.

This invention relates to improvements in a process of manufacturing slabs or blocks of building material for use in the construction of walls, partitions, ceilings, floors, and the like, the object being to provide a building material that will be very light but possessing great firmness and strength, that will be practically a non-conductor of heat and cold, that will not be influenced by changes in temperature, fire and sound proof, and that on account of the cheapness of the raw material may be produced at a very low cost.

I will describe a process of forming building material embodying my invention and then point out the novel features in the appended claim.

Reference is to be had to the accompanying drawings, forming a part of this specification, in which similar characters of reference indicate corresponding parts in all the views.

Figure 1:
Figure 2:
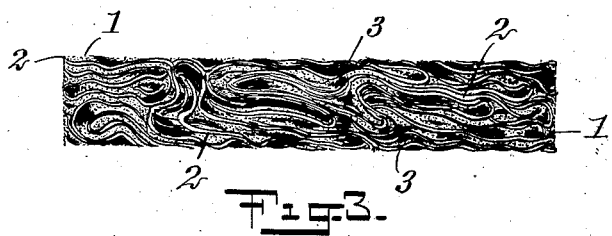
Figure 3:
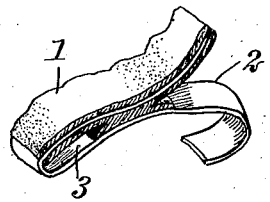

Figure 1 is a face view of a section of building material embodying my invention. Fig. 2 is an edge view thereof, and Fig. 3 is a detail perspective showing one of the fibers and its coating.

The building material comprises a binding or body portion 1—such, for instance, as a mixture of plaster-of-paris and dextrin or cement—and with the mixture a suitable fiber 2 is soaked. This fiber may consist of excelsior, vegetable fiber, or even straw. After incorporating the three elements the mass is then, by machinery or by hand, squeezed out and partly freed by such operation from the binding material, and so that each fiber is only slightly covered with the binding material. After the squeezing operation the mass is placed in a suitable device and well distributed, when it is to be molded by a slight pressure, so that an interstitial tissue-like plate, slab, or block is produced, which is due to each fiber taking to itself a plastic form. In stating that the material takes a tissue-like form I mean that it is provided with variously-disposed depressions 3 and small holes.

In order to give the slab, block, or the like a better appearance, it may be put into a larger mold or pressing device and covered partly or all around with a coating—such, for instance, as plaster-of-paris or cement.

As in this process I employ any desired amount of fiber or the like and a comparatively small amount of binding material is used, as before stated, the material is of great lightness, at the same time possessing great firmness and strength, and on account of its porosity produced by the many small holes and cavities, it results practically in a non-conductor of heat and cold.

Having thus described my invention, I claim as new and desire to secure by Letters Patent—

The herein-described process of forming a slab, block or the like of building material, consisting in forming a binder of plaster-of-paris and dextrin or the like, then soaking in said binder a number of vegetable fibers, then removing the excess of binder from said fibers, whereby the individual fibers are but slightly covered with said binder, and then molding the covered fibers into an interstitial body, by slight pressure.

In testimony whereof I have signed my name to this specification in the presence of two subscribing witnesses.

JOHANNES OLTMANNS.

Witnesses:
 KARL LAUBER,
 HEINRICH BAUSER.